UNITED STATES PATENT OFFICE.

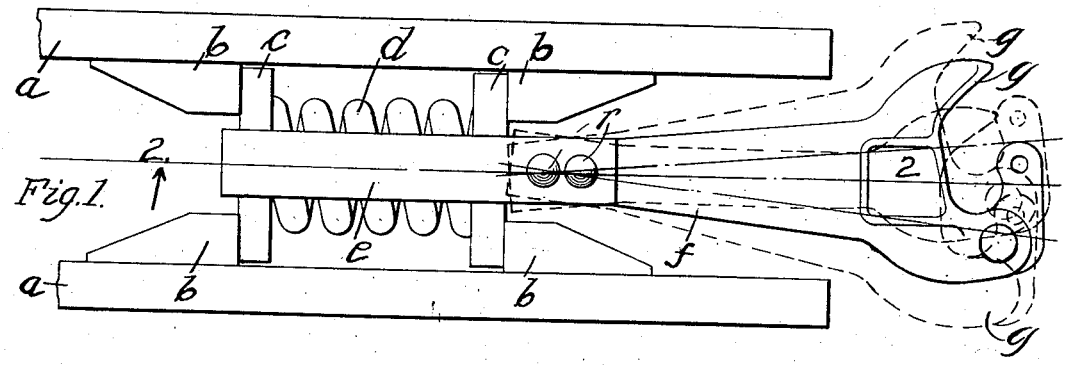
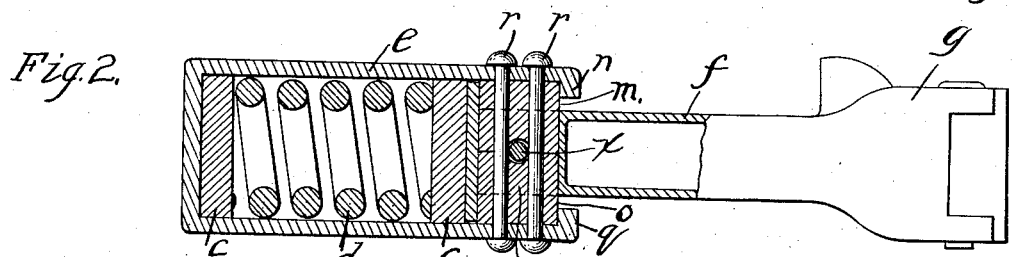
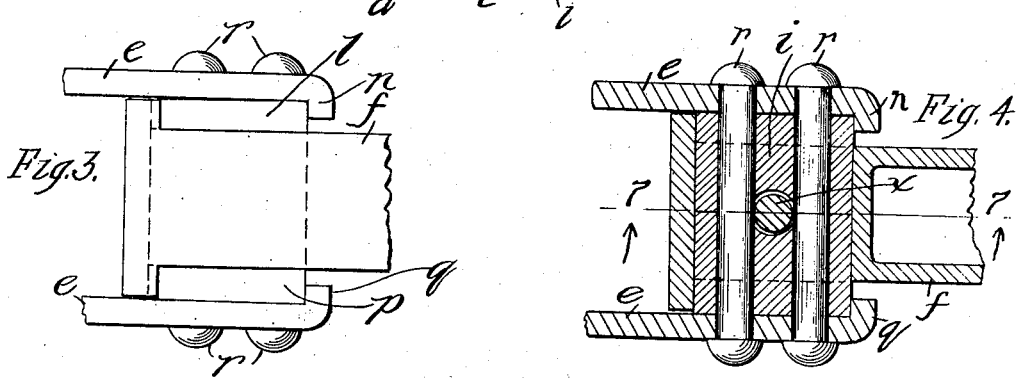
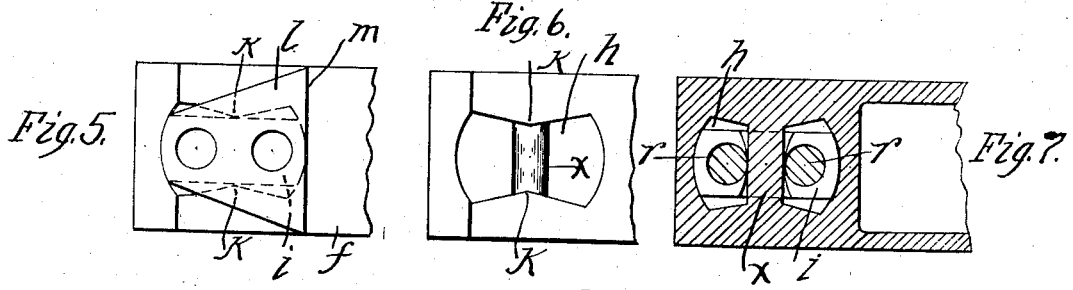
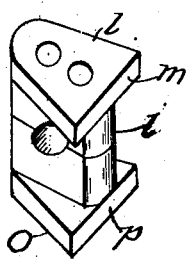

JAMES R. CARDWELL, OF CHICAGO, ILLINOIS.

COUPLING.

1,058,722. Specification of Letters Patent. Patented Apr. 15, 1913.

Application filed June 12, 1908. Serial No. 438,014.

*To all whom it may concern:*

Be it known that I, JAMES R. CARDWELL, citizen of the United States, residing at Chicago, in the county of Cook and State of Illinois, have invented a certain new and useful Improvement in Couplers, of which the following is a full, clear, concise, and exact description, reference being had to the accompanying drawings, forming a part of this specification.

The invention relates to couplers adapted for use in connection with draft gears of any desired form, its object being to provide improved means for articulating the connection between the coupler shank and the yoke which connects it with the gear proper, so as to provide for lateral movement of the coupler independently of the yoke.

The invention is fully hereinafter described, and is illustrated in the accompanying drawings, in which—

Figure 1 is a detail plan view of the center sills of a car, and showing a simple form of draft gear, and the coupler and yoke as being provided with the improved connecting means; Fig. 2 is a sectional view on the line 2—2 of Fig. 1, the sills and draft lugs being omitted; Fig. 3 is a detail side elevation of the butt of the coupler shank and the forward end of the yoke; Fig. 4 is a sectional detail, on an enlarged scale, of the same parts, taken on the line 2—2 of Fig. 1; Fig. 5 is a detail plan of the butt of the coupler shank, and showing the element constituting the connection between the shank and the yoke; Fig. 6 is a detail plan of the butt of the coupler shank; Fig. 7 is a detail plan section, on the line 7—7 of Fig. 4; Fig. 8 is a view in perspective of the element for connecting the coupler with the yoke.

The forward ends of a pair of center sills are shown at *a, a*, four draft lugs, *b*, being shown as applied to the inner faces of the sills. A pair of follower plates, *c, c*, is shown, one plate being associated with the rearward and the other with the forward pair of draft lugs. At *d* there is shown a spring interposed between the followers, and at *e* a yoke, of the conventional M. C. B. type, inclosing the gear and having the forward ends of its longitudinal arms lipped inwardly, as shown at *n, q*, in accordance with the usual practice.

The coupler is shown at *f*, and is provided with any suitable form of head, *g*. The butt of the coupler shank *f* is vertically apertured, as shown at *h*, the forward and rearward walls of the aperture being curved, preferably being arcs of a circle struck from the vertical axis of the aperture. The side walls of the aperture *h* converge from each end, forming the apexes *k* midway of the length of the aperture. A strut or bridge, *x*, extends horizontally across the aperture *h*, midway of its length and height. A pivot member, *i*, is located within the aperture *h*, and is secured by means of rivets, *r*, to the yoke *e*. The body portion of the pivot member is oblong in cross section, its front and rear walls bearing against the curved walls of the aperture *h* and conforming thereto in curvature; its side walls being flattened and bearing against the apexes *k*. The pivot element is transversely apertured to loosely receive the strut or bridge. To permit of the assembling of the parts, the pivot element is horizontally divided into two sections, the parting being through its strut-receiving aperture. The ends of the pivot element are provided with enlarged heads, *l, o*, adapted to fit against the inner faces of the yoke arms and presenting forward faces, *m, p*, which rest against the inner faces of the yoke lips, *n, q*. The inner end of the coupler shank bears against the forward follower *c*, and preferably is extended upwardly and downwardly to increase its bearing area, as most plainly shown in Fig. 3.

I claim as my invention—

In a draft mechanism for cars, in combination, a coupler bar having its butt vertically apertured, the front and rear walls of the aperture being curved and its side walls converging from front and rear; a yoke having top and bottom members inclosing the coupler butt; a two part pivot having its sections attached to the yoke members and entering the coupler bar aperture, the inner ends of the pivot sections being in abutting engagement and transversely recessed; the side walls of the pivot being flattened and engaging the apexes of the side walls of the aperture, and its front and rear walls being curved and engaging and being of less width than the curved walls of the aperture; and a bridge crossing the coupler bar aperture and passing loosely through the recesses in the pivot sections.

In witness whereof, I hereunto subscribe my name this 10th day of June A. D., 1908.

JAMES R. CARDWELL.

Witnesses:
N. YOSSE,
G. L. CRAGG.